United States Patent
Riegel

(10) Patent No.: US 11,536,912 B2
(45) Date of Patent: Dec. 27, 2022

(54) APPARATUS FOR TERMINATING OPTICAL CABLES; AND METHODS

(71) Applicant: COMMSCOPE TECHNOLOGIES LLC, Hickory, NC (US)

(72) Inventor: Michael S. Riegel, Bonfield, IL (US)

(73) Assignee: CommScope Technologies LLC, Hickory, NC (US)

(*) Notice: Subject to any disclaimer, the term of this patent is extended or adjusted under 35 U.S.C. 154(b) by 169 days.

(21) Appl. No.: 17/040,391

(22) PCT Filed: Mar. 22, 2019

(86) PCT No.: PCT/US2019/023713
§ 371 (c)(1),
(2) Date: Sep. 22, 2020

(87) PCT Pub. No.: WO2019/183567
PCT Pub. Date: Sep. 26, 2019

(65) Prior Publication Data
US 2021/0018700 A1    Jan. 21, 2021

Related U.S. Application Data

(60) Provisional application No. 62/646,430, filed on Mar. 22, 2018.

(51) Int. Cl.
*G02B 6/38* (2006.01)
(52) U.S. Cl.
CPC ......... *G02B 6/3861* (2013.01); *G02B 6/3834* (2013.01); *G02B 6/3869* (2013.01)

(58) Field of Classification Search
None
See application file for complete search history.

(56) References Cited

U.S. PATENT DOCUMENTS

| | | | |
|---|---|---|---|
| 4,938,558 A | 7/1990 | Miller et al. | |
| 5,390,270 A * | 2/1995 | Hanzawa | G02B 6/3855 385/139 |
| 8,702,320 B2 | 4/2014 | Ott | |
| 8,753,021 B1 | 6/2014 | Baca et al. | |
| 9,239,428 B2 | 1/2016 | Christopher et al. | |
| 9,348,095 B2 | 5/2016 | Zimmel | |
| 10,274,684 B2 * | 4/2019 | Danley | G02B 6/3861 |
| 2002/0186934 A1 * | 12/2002 | Hug | G02B 6/4292 385/80 |
| 2006/0269192 A1 * | 11/2006 | Hayasaka | G02B 6/3834 385/60 |
| 2008/0031573 A1 * | 2/2008 | Droege | G02B 6/3861 385/78 |
| 2012/0315001 A1 | 12/2012 | Beck | |
| 2017/0131483 A1 | 5/2017 | Droege et al. | |

OTHER PUBLICATIONS

International Search Report and Written Opinion of the International Searching Authority for International Patent Application No. PCT/US2019/023713 dated Aug. 9, 2019, 10 pages.

* cited by examiner

*Primary Examiner* — Jerry Rahll
(74) *Attorney, Agent, or Firm* — Merchant & Gould P.C.

(57) ABSTRACT

The present disclosure relates generally to methods for processing ferrules of fiber optic connectors such that the amount of cleaving and/or polishing that is required is eliminated or at least reduced. An apparatus and method of dispensing adhesive through a front end face of a fiber optic ferrule are provided.

17 Claims, 19 Drawing Sheets

APPARATUS FOR TERMINATING OPTICAL CABLES; AND METHODS

CROSS-REFERENCE TO RELATED APPLICATION

This application is a National Stage Application of PCT/US2019/023713, filed on Mar. 22, 2019, which claims the benefit of U.S. Patent Application Ser. No. 62/646,430, filed on Mar. 22, 2018, the disclosures of which are incorporated herein by reference in their entireties. To the extent appropriate, a claim of priority is made to each of the above disclosed applications.

TECHNICAL FIELD

The present disclosure relates generally to devices and methods used in the precision assembly of component parts, and specifically to devices and methods for terminating optical fibers.

BACKGROUND

Typically the end of a fiber optic cable is terminated by a fiber optic connector by gluing the fiber within the cable to a ferrule of the connector. A well-known fiber optic cable size includes an inner glass fiber of 125 microns in diameter, with an outer coating of 250 microns in diameter, covered by a polymeric buffer layer of 900 microns in diameter.

As is known in the art, two optical fibers are connected by bringing the end faces of the optical fibers into coaxial alignment such that the optical fiber end faces abut or are separated by only a slight distance. In this way, the two optical fibers form a substantially continuous waveguide to transmit signals. Typically, each optical fiber is mounted in a passageway (e.g., a bore, channel, groove, or any other similar structure) formed through a ferrule, which may be a cylindrical or non-cylindrical shaped body made of material, such as, ceramic or plastic.

A conventional method of assembling an optical fiber connector includes directly inserting a needle or nozzle into a rear end of a ferrule. The needle is inserted into the rear end of the ferrule which is a cylindrical member through which an optical fiber passes, and an adhesive is injected. The adhesive is typically applied until the adhesive emerges from a front end opening of the ferrule. Next, a buffered fiber with an optical fiber exposed at a front end is inserted from the rear end of the ferrule. As the optical fiber is pushed through the ferrule, the optical fiber displaces the adhesive to push the adhesive out of the front end opening of the ferrule, and the buffered fiber and the optical fiber are adhered to the ferrule.

One problem with this method is that the movement of excess adhesive is not controlled. Thus, the excess adhesive has the potential to contaminate an end face of the ferrule. The contamination can cause complications in the assembly process and increase the processing time.

There is a need to improve the process of dispensing adhesive to help control the quantity and movement of the adhesive and allow for high speed automation.

SUMMARY

The present disclosure also relates to an apparatus and method for mounting an optical fiber in a passageway of a fiber optic ferrule.

One aspect of the present disclosure relates to a method of terminating an optical fiber with a fiber optic ferrule. The method can include the steps of: providing a cable with the optical fiber, the optical fiber including a coating portion around the optical fiber, the optical fiber also including a bare portion adjacent an end of the optical fiber; providing the fiber optic ferrule, the fiber optic ferrule including a ferrule body extending from a first end to an opposite second end, the ferrule body including a passage extending between the first and the second ends of the ferrule body, the fiber optic ferrule having a front end face at the first end; injecting an amount of adhesive material into the passage of the ferrule body from the front end face of the fiber optic ferrule; and inserting the end of the optical fiber into the passage of the ferrule body from the second end thereof, with the bare portion of the optical fiber and at least a portion of the coated portion of the optical fiber inserted into the passage of the ferrule body, wherein the adhesive material is adapted to hold the optical fiber to the ferrule body.

Another aspect of the present disclosure relates to method of injecting adhesive into an optical connector. The optical connector can include a ferrule with a passage extending between first and second ends of the ferrule. The ferrule can have a front end face at the first end. The method can include the steps of: providing a conduit with adhesive loaded therein; aligning the conduit to be substantially aligned with the front end face of the ferrule; moving the conduit toward the front end face of the ferrule to make contact therewith, wherein the conduit is moved forward until a compression force is applied upon the ferrule; dispensing from the conduit a portion of the adhesive into the passage of the ferrule from the front end face of the ferrule; detecting from the second end of the ferrule a volume of adhesive within the ferrule to determine appropriate adhesive fullness prior to insertion of an optical fiber into the passage of the ferrule and the conduit; withdrawing the conduit a distance from the front end face of the ferrule that results in a meniscus forming between the conduit and the front end face of the ferrule, and wherein excess adhesive is pulled inside of the conduit and away from the front end face of the ferrule and the optical fiber; and removing the conduit from the ferrule.

A further aspect of the present disclosure relates to a method of injecting an adhesive material into an optical connector. The optical connector can include a ferrule with a passage extending between first and second ends of the ferrule. The ferrule can have a front end face at the first end. The method can include steps of: dispensing a portion of the adhesive material contained within a conduit into the passage of the ferrule from the front end face of the ferrule; and detecting from the second end of the ferrule a volume of the adhesive material within the ferrule to determine an appropriate fullness.

Another aspect of the present disclosure relates to an apparatus for terminating an optical fiber with a fiber optic ferrule. The apparatus can include a holder configured to receive and support the fiber optic ferrule, wherein the fiber optic ferrule has a longitudinally extending passageway; a dispensing device, the dispensing device including a syringe for containing fluid adhesive to be dispensed; a V-block guide for supporting the dispensing device and concentrically aligning the dispensing device with an end face of the fiber optic ferrule; a device for moving the V-block guide relative to the holder of the fiber optic ferrule; and a fiber insertion device for inserting the optical fiber into both the fiber optic ferrule and the dispensing device.

A variety of additional inventive aspects will be set forth in the description that follows. The inventive aspects can relate to individual features and to combinations of feature. It is to be understood that both the foregoing general description and the following detailed description are exemplary and explanatory only and are not restrictive of the broad inventions and inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
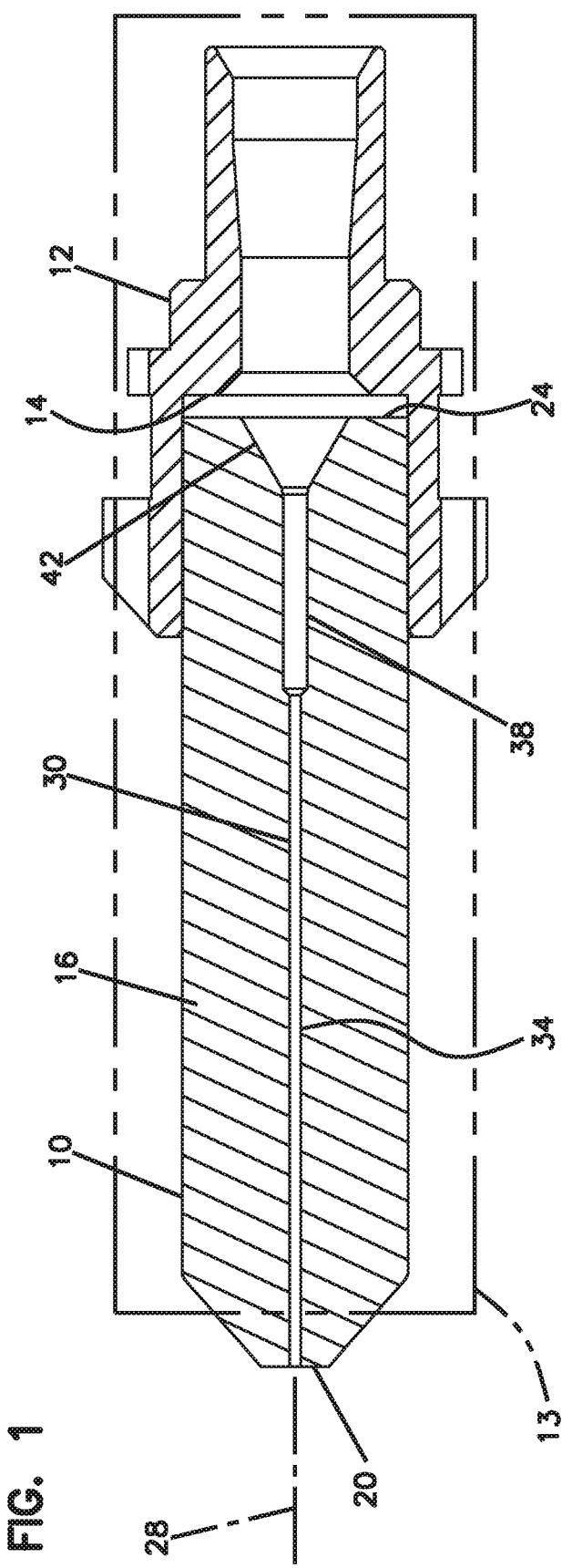
FIG. 1 illustrates a cross-sectional side view of an example fiber optic ferrule and a hub in accordance with the principles of the present disclosure.
Figure 2:
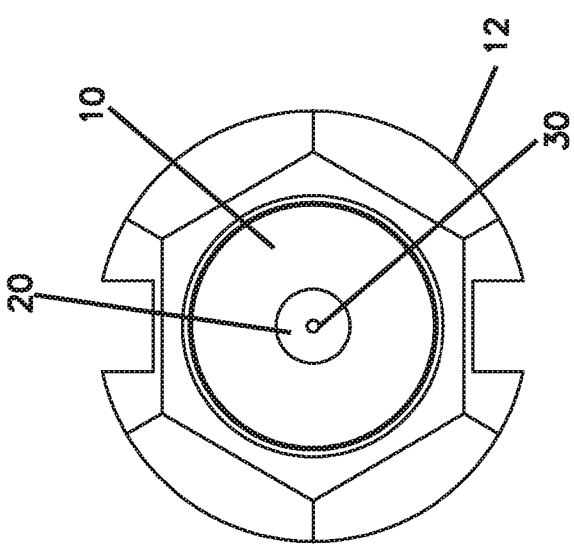
FIG. 2 illustrates an end view of the fiber optic ferrule and hub of FIG. 1.

Referring now to FIGS. 1-6, an example fiber optic ferrule 10 is shown mounted to a hub 12. Generally, the fiber optic ferrule 10 and hub 12 are secured together by convenient methods including press fit or adhesive mounts. The fiber optic ferrule 10 and hub 12 are mounted within a connector housing 13 shown in dashed lines in FIG. 1. The connector housing 13 can be one of a variety of well-known connector types, including SC, FC, ST, LX.5, LC, and others. As will be described below, the fiber optic ferrule 10 and hub 12 are connected to an end of a fiber optic cable for use in connectorizing the end of the fiber optic cable.

The fiber optic ferrule 10 includes a body 16 with a first end 20 defining a ferrule tip. The body 16 of the fiber optic ferrule 10 includes an opposite second end 24 received in a pocket 14 of the hub 12. The fiber optic ferrule 10 includes a central axis 28. The first end 20 of the fiber optic ferrule 10 is typically polished along with the fiber after the fiber is installed. The body 16 of the fiber optic ferrule 10 is typically ceramic in construction.

The fiber optic ferrule 10 includes a central passage 30 concentric with the central axis 28. The central passage 30 extends from the first end 20 to the opposite second end 24. The central passage 30 includes a first portion 34 having a first diameter, an intermediate or second portion 38 having a second diameter, and a rear or third portion 42. The first portion 34 is sized to receive the inner fiber sized at 125 microns. The second portion 38 is sized to receive the portion of the fiber optic cable including the outer coating at 250 microns. The third portion 42 is tapered inward from the opposite second end 24 so as to facilitate insertion of the fiber during installation.

Figure 7:
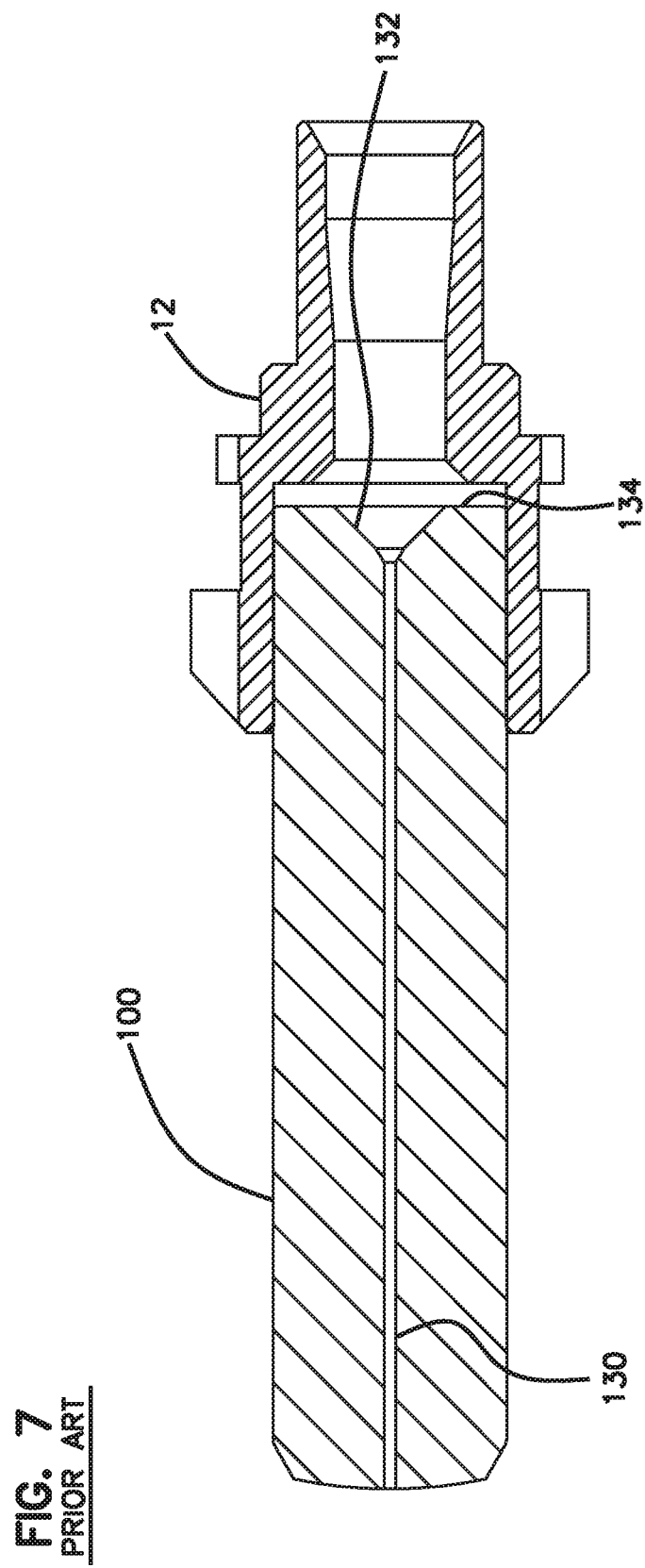
FIG. 7 illustrates a cross-sectional side view of a prior art ferrule and hub.

In prior art ferrules, such as ferrule 100 shown in FIG. 7, dual diameters were not provided. In particular, the ferrule 100 of FIG. 7 includes a central passage 130 having a uniform diameter sized for receipt of the inner fiber at 125 microns. A tapered portion 132 extends from end 134 to the central passage 130.

In contrast, the fiber optic ferrule 10 includes dual diameter portions 34, 38, each specially sized to receive the inner fiber (125 microns) and a portion of the outer coating (250 microns), respectively.

Figure 3:
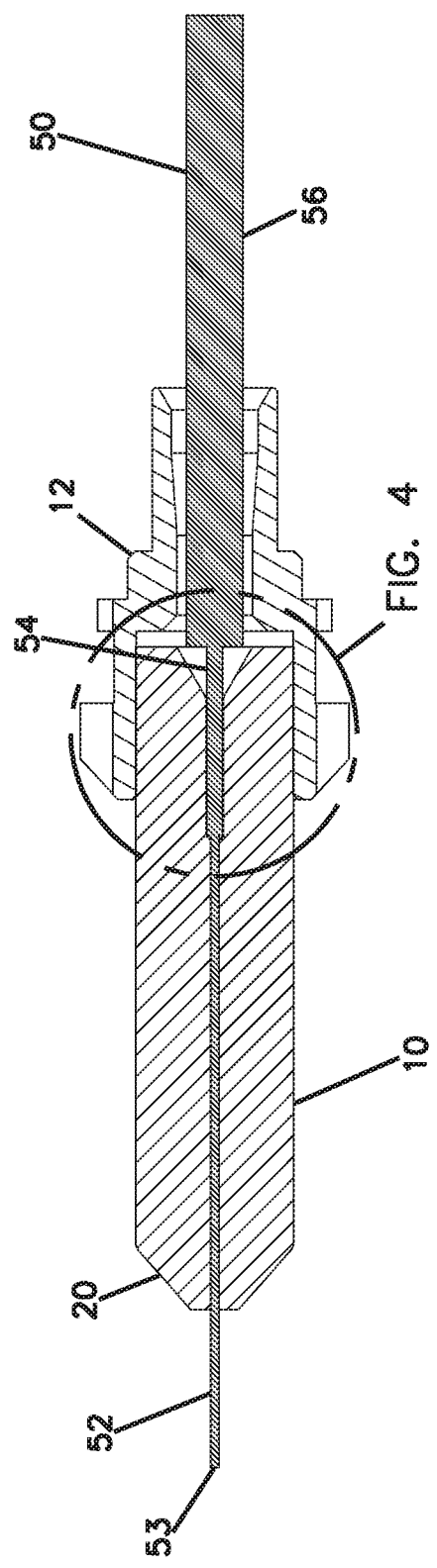
FIG. 3 illustrates a cross-sectional side view of the fiber optic ferrule and hub of FIG. 1 and includes a fiber optic cable inserted into an inner passage through the fiber optic ferrule.
Figure 4:
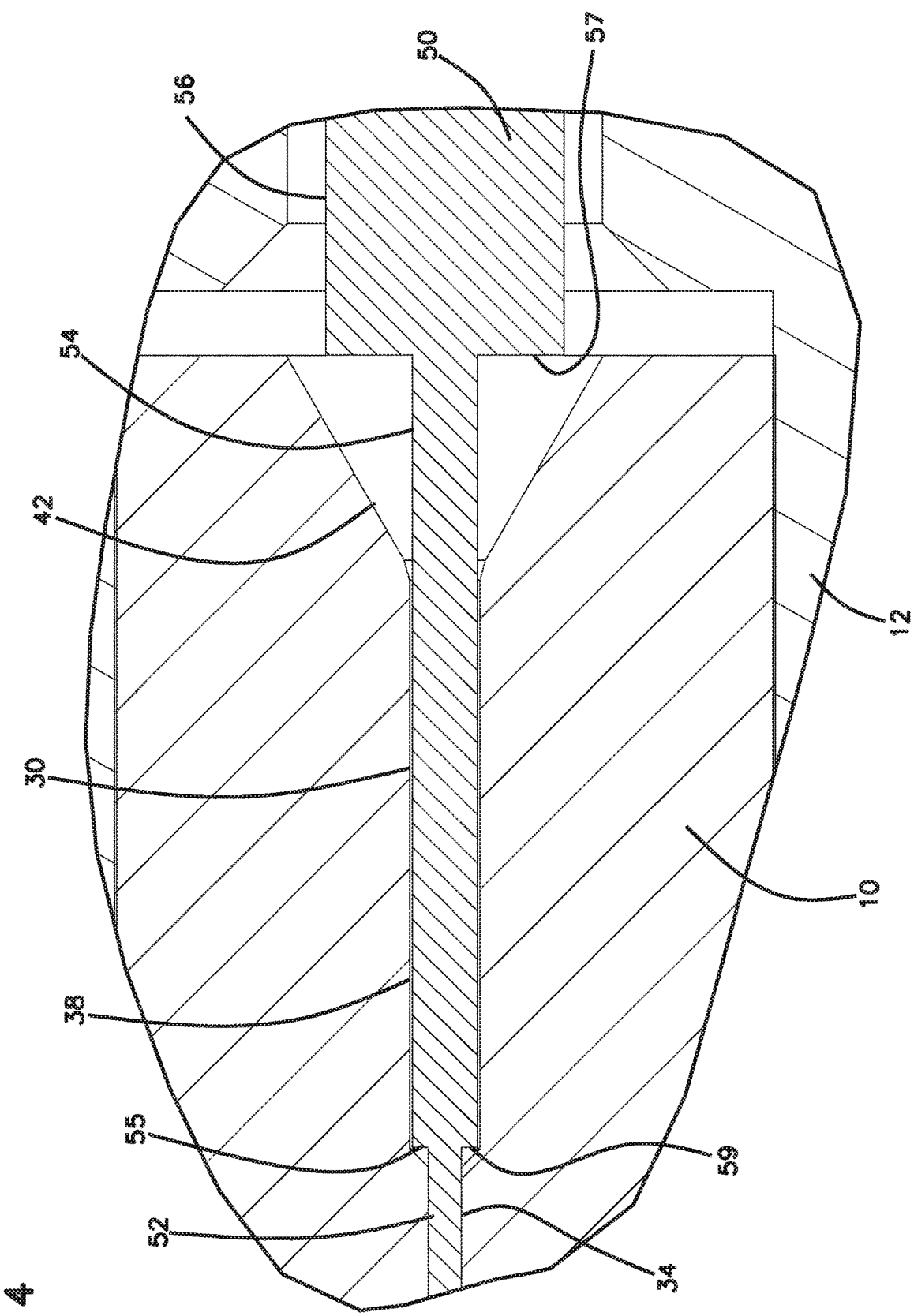
FIG. 4 illustrates an enlarged cross-sectional view of a portion of the fiber optic ferrule, hub, and fiber optic cable of FIG. 3.

Referring now to FIGS. 3 and 4, a fiber optic cable 50 is shown with an inner fiber 52, an outer coating 54, and a buffer layer 56. The inner fiber 52 terminates at end 53. Typically, end 53 is removed and polished with the first end 20 of the fiber optic ferrule 10. The outer coating 54 terminates at end 55. The buffer layer 56 terminates at end 57. As shown, a portion of the outer coating 54 extends beyond the end 57 of the buffer layer 56.

With special reference to FIG. 4, the fiber optic ferrule 10 closely surrounds the inner fiber 52, and the outer coating 54. Epoxy is used within the central passage 30 to adhesively hold the fiber optic cable 50 to the fiber optic ferrule 10, which will be described in detail below. As shown, the central passage 30 defines a small conically shaped pocket 59 around the end 55 of the outer coating 54. The pocket 59 is the transition area between the first and second portions 34, 38 of the central passage 30.

Figure 5:
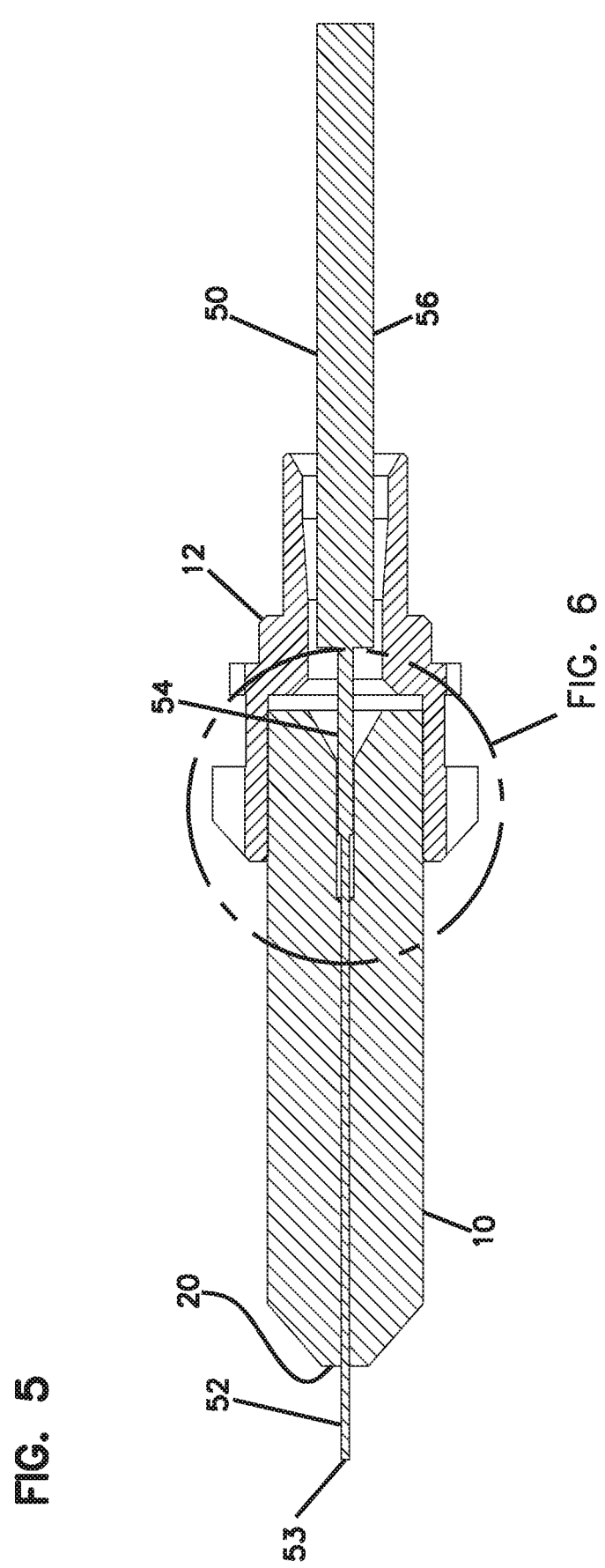
FIG. 5 illustrates a cross-sectional side view of the fiber optic ferrule and hub of FIG. 1 and includes a fiber optic cable inserted into the inner passage through the fiber optic ferrule with a fiber coating layer not as fully inserted into the fiber optic ferrule.
Figure 6:
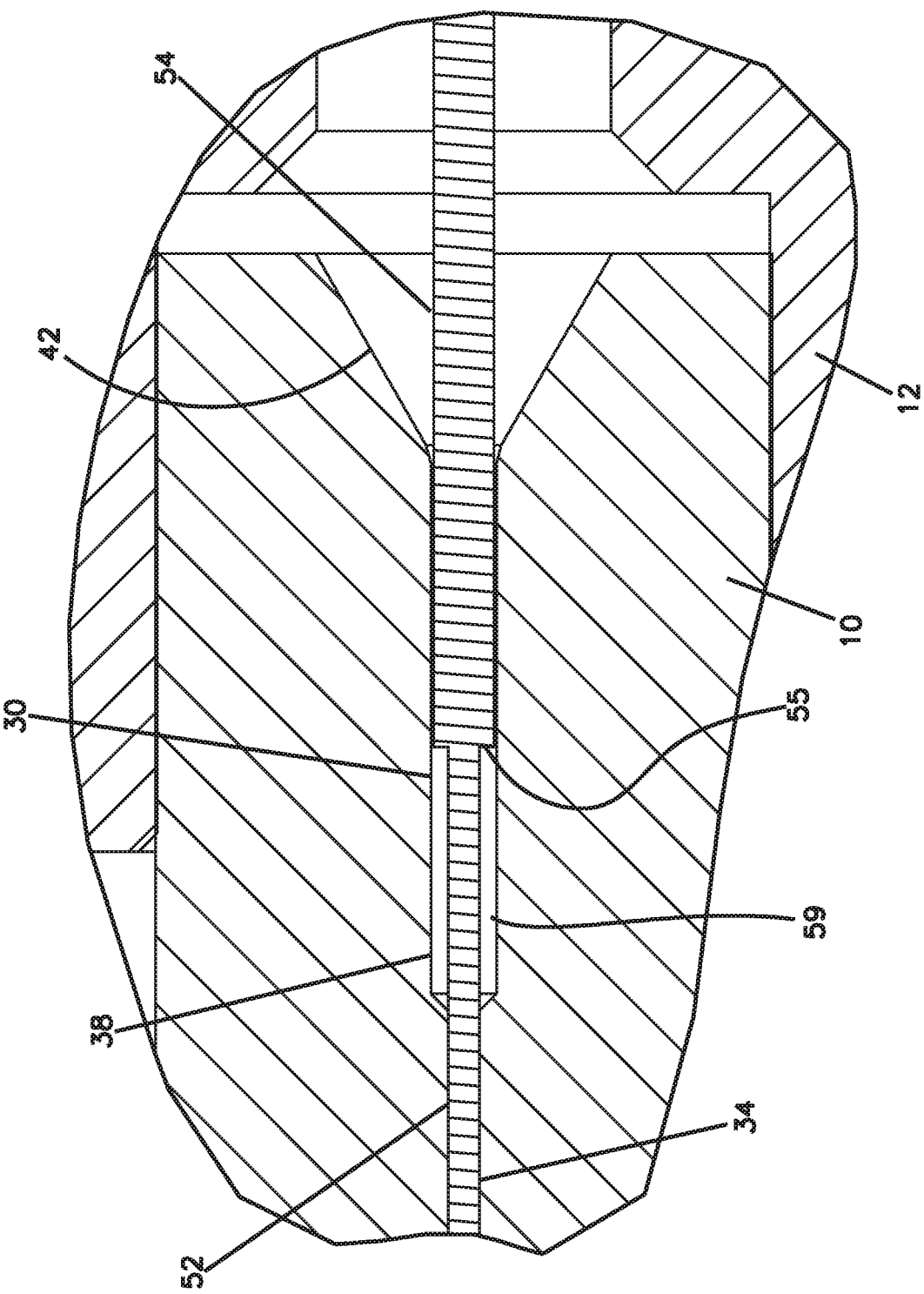
FIG. 6 illustrates an enlarged cross-sectional view of a portion of the fiber optic ferrule, hub, and fiber optic cable of FIG. 5.

In certain examples, the outer coating 54 does not need to be fully inserted into the fiber optic ferrule 10, as shown in FIGS. 3 and 4. As shown in FIGS. 5 and 6, the pocket 59 can be larger around the end 55 of the outer coating 54. Both arrangements can provide for less epoxy around the inner fiber 52, than in the arrangement of FIG. 7.

In the example fiber optic ferrule 10, the first portion 34 can have a first dimension sized large enough to receive the uncoated fiber, but not so large as to receive the coated fiber. The second portion 38 can have a second dimension large enough to receive the coated fiber, but not so large as to receive the buffer. Further details regarding structural features of the dual diameter ferrule can be found at U.S. Pat. No. 9,348,095, which is hereby incorporated by reference in its entirety.

Figure 8:
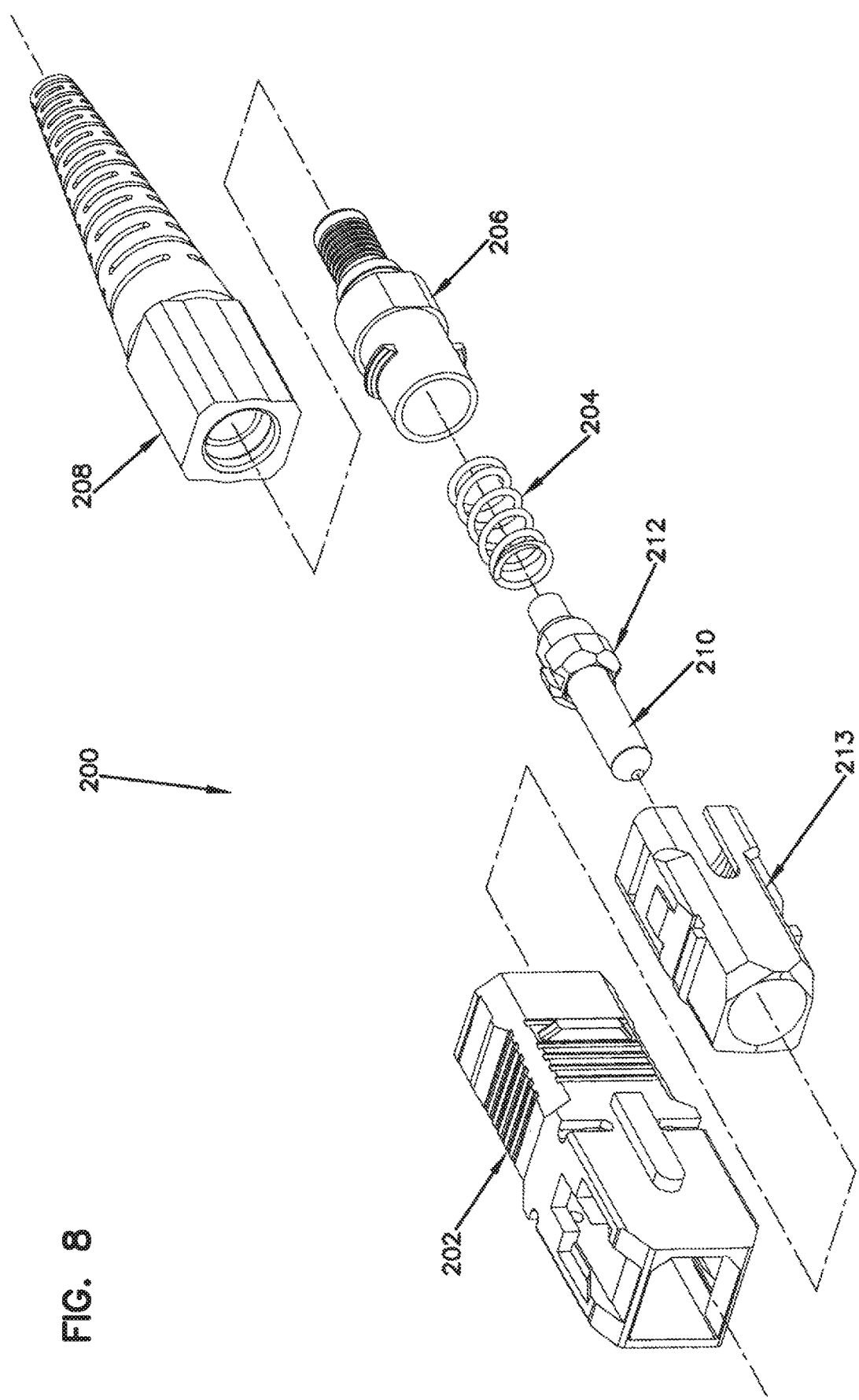
FIG. 8 illustrates an exploded perspective view of a fiber optic connector in accordance with the principles of the present disclosure.
Figure 9:
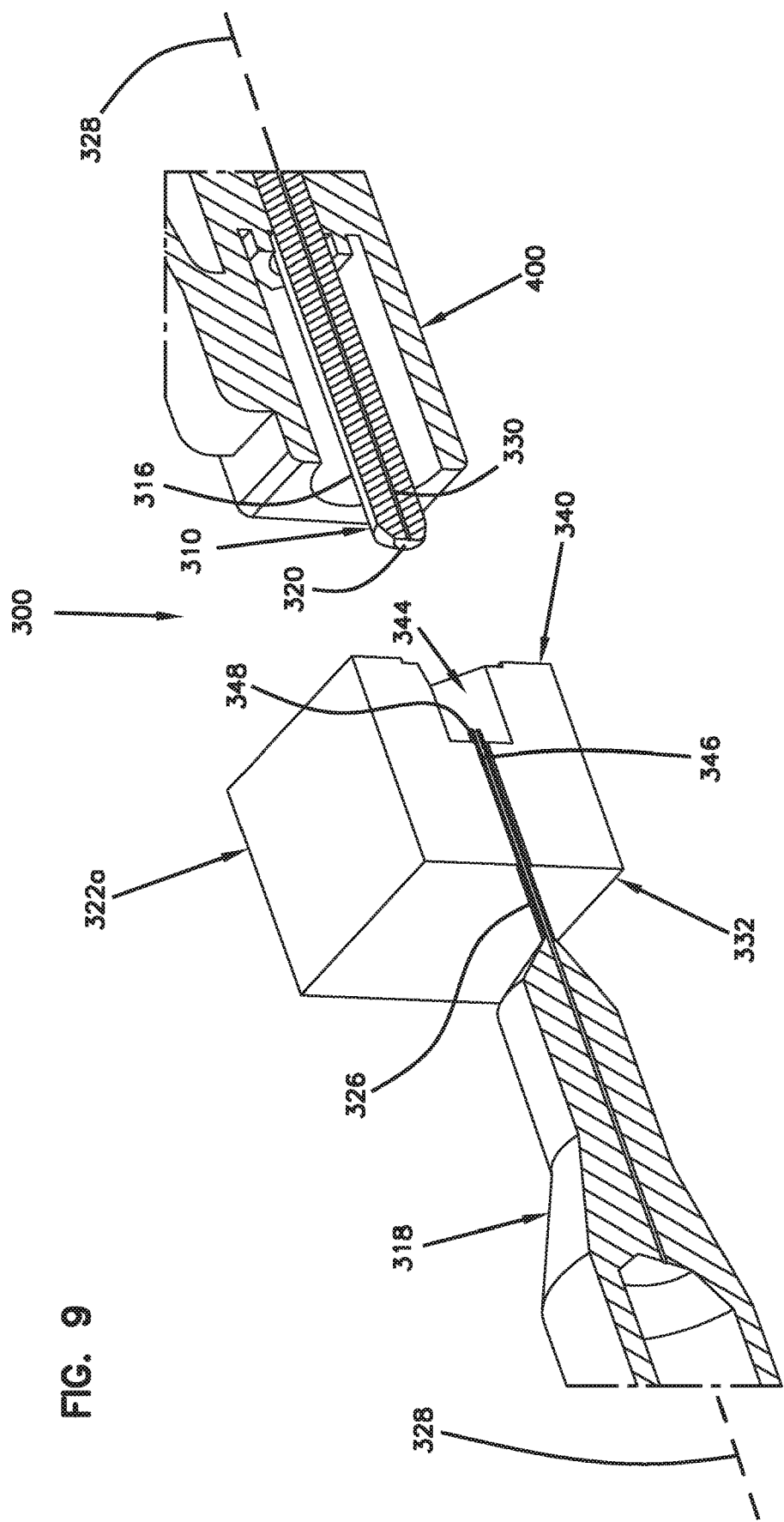
FIGS. 9-17 illustrate a sequence of steps for securing an optical fiber within a fiber optic ferrule in accordance with the principles of the present disclosure.

Referring to FIG. 8, an exploded view of an example fiber optic connector 200 is depicted including a fiber optic ferrule 210. The fiber optic ferrule 210 can be mounted to a hub 212 of the fiber optic connector 200. The fiber optic ferrule 210 and the hub 212 are secured together by convenient methods including press fit or adhesive mounts. In certain examples, the hub 212 is a plastic material that is overmolded onto the ferrule 210. The fiber optic ferrule 210 and the hub 212 can be mounted within a connector housing 213. In the example depicted, the connector housing 213 is an SC type connector housing, and the fiber optic connector 200 is an SC type fiber optic connector. In other examples, the fiber optic connector 200 can be one of a variety of well-known connector types, including FC, ST, LX.5, LC, and others. The fiber optic ferrule 210 and the hub 212 can be connected to the end of the fiber optic cable 50 for use in connectorizing the end of the fiber optic cable 50. The fiber optic connector 200 may further include a release sleeve 202, a spring 204, a proximal member 206, and/or a cable strain relief member 208.

Referring now to FIGS. 9-20, an example apparatus 300 is depicted. The apparatus 300 can be used for terminating an optical fiber with a fiber optic ferrule. In certain examples, the apparatus 300 may include a holder (e.g., holding fixture, clip)(not shown), a dispensing device 318 that may or may not include a syringe (e.g., tube, conduit), a V-block guide 322, a guide positioning mechanism (not shown), and a fiber insertion device (not shown).

The holder can be configured to receive and support a fiber optic ferrule 310 of a fiber optic connector 400. The fiber optic ferrule 310 can have a longitudinally extending central passage 330 (e.g., passageway, cavity). The central passage 330 may include dual diameter portions as described above. In certain examples, the central passage 330 may be molded into a body 316 of the fiber optic ferrule 310. In other examples, the central passage 330 may be machined into the body 316 of the fiber optic ferrule 310.

In certain examples, a plunger may be used with the dispensing device 318 to eject fluid adhesive (e.g., adhesive material) therefrom. In certain examples, the adhesive may be loaded into the dispensing device 318 for use in an automatic dispensing machine. The dispensing device 318 may be moved manually, may be controlled via an automated mechanism, or a robotic manipulator (e.g., robotic arm)(not shown). A processor (not shown) may operatively control the manipulator. The dispensing device 318 may be positioned adjacent to the holder to direct a stream or volume of fluid adhesive such as epoxy into the fiber optic ferrule 310. It will be appreciated that the flow of adhesive provided to the fiber optic ferrule 310 can be varied to vary the flow characteristics of the fluid adhesive. That is, the adhesive can be dispensed such that the quantity of adhesive dispensed is contained and controlled.

In certain examples, the dispensing device 318 may be fitted with a nozzle 326 to help direct the flow into and out of the dispensing device 318. In other examples, the dispensing device 318 may be fitted with a needle or tubing. The dispensing device 318 may include a container (e.g., a vessel, a housing, a canister, barrel etc.) for holding the adhesive. The reservoir may include a funnel which guides the adhesive toward the nozzle 326 of the dispensing device 318.

Figure 10:
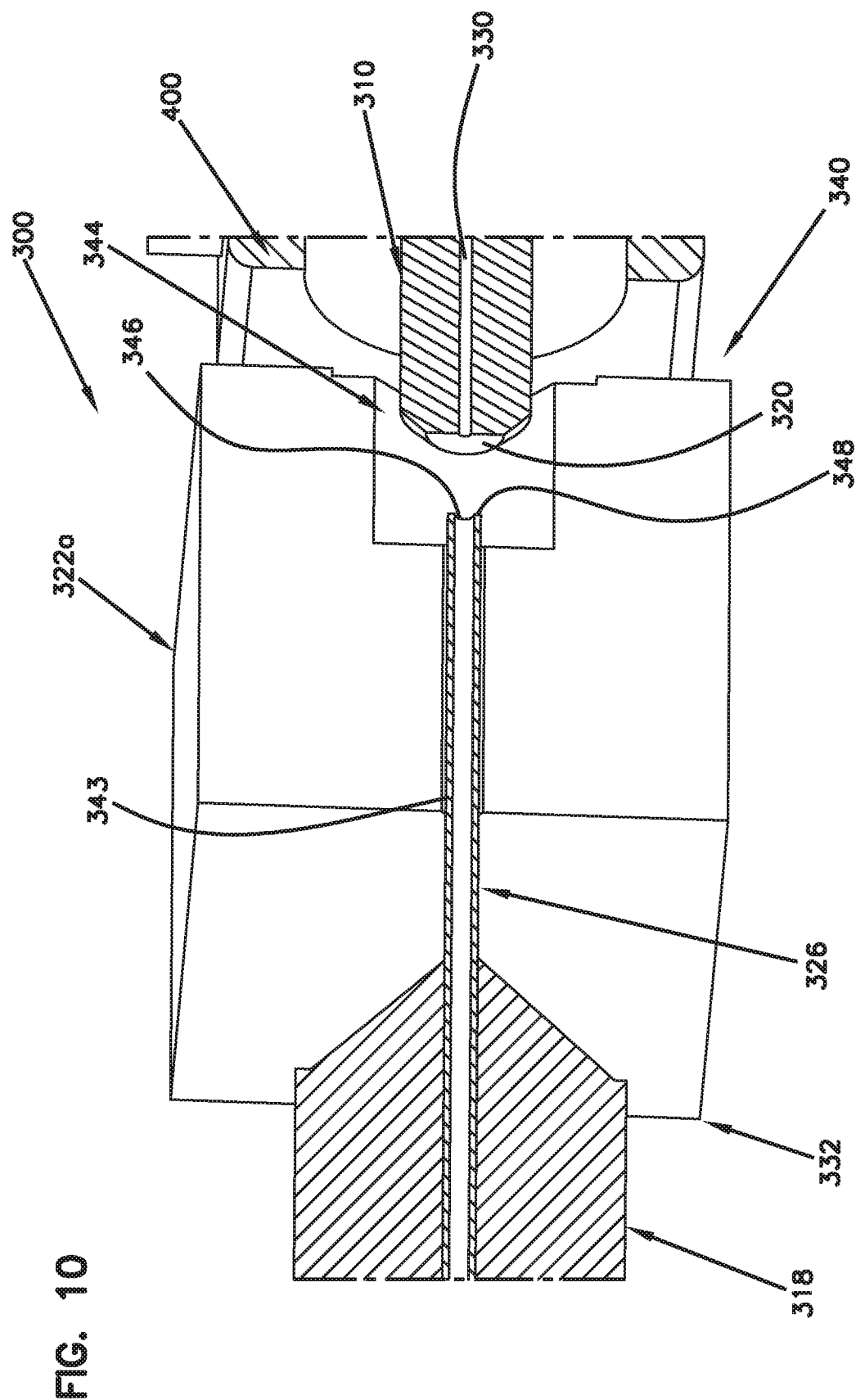
Figure 18:
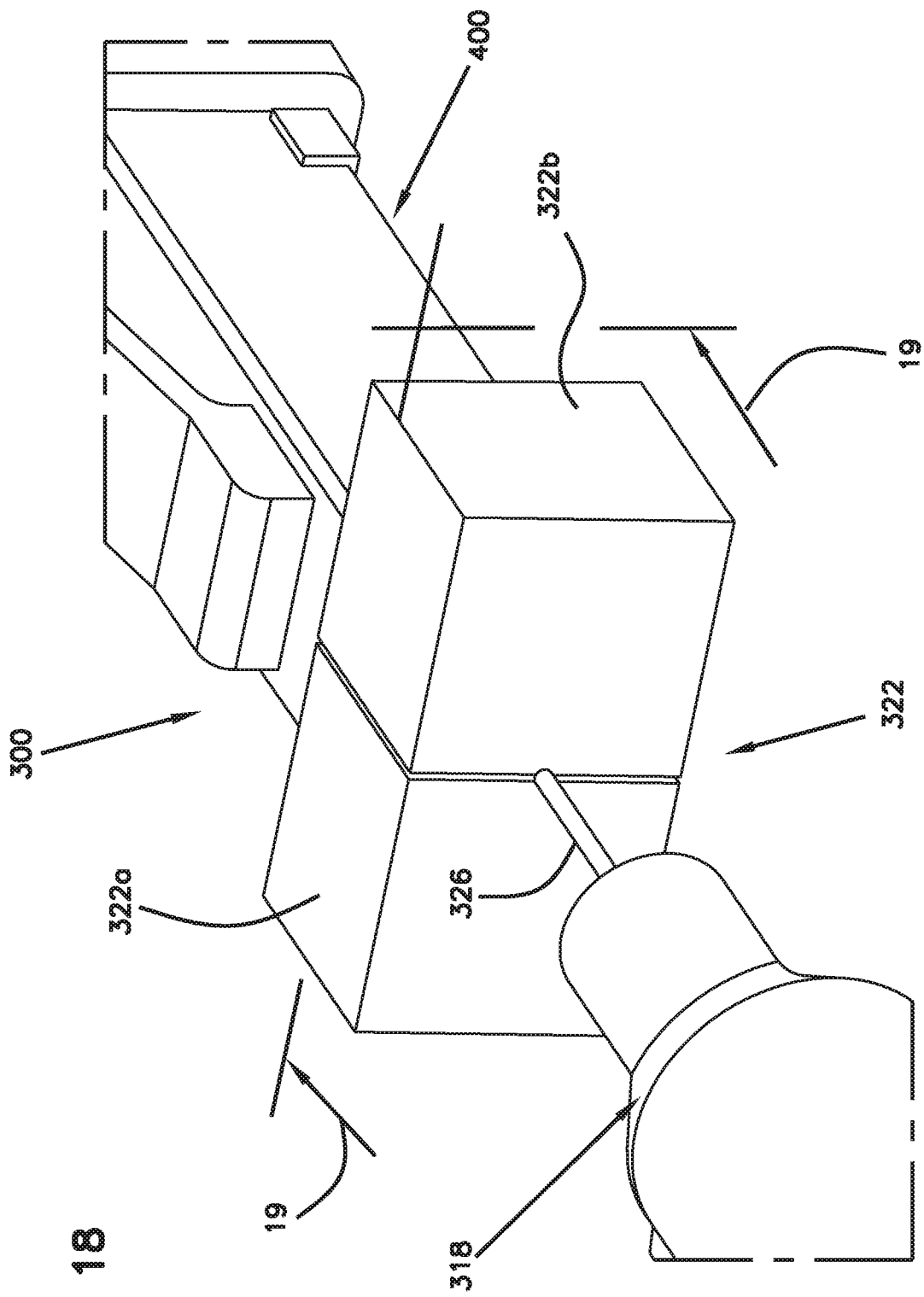
FIG. 18 illustrates an example apparatus for terminating an optical fiber with a fiber optic ferrule in accordance with the principles of the present disclosure.
Figure 19:
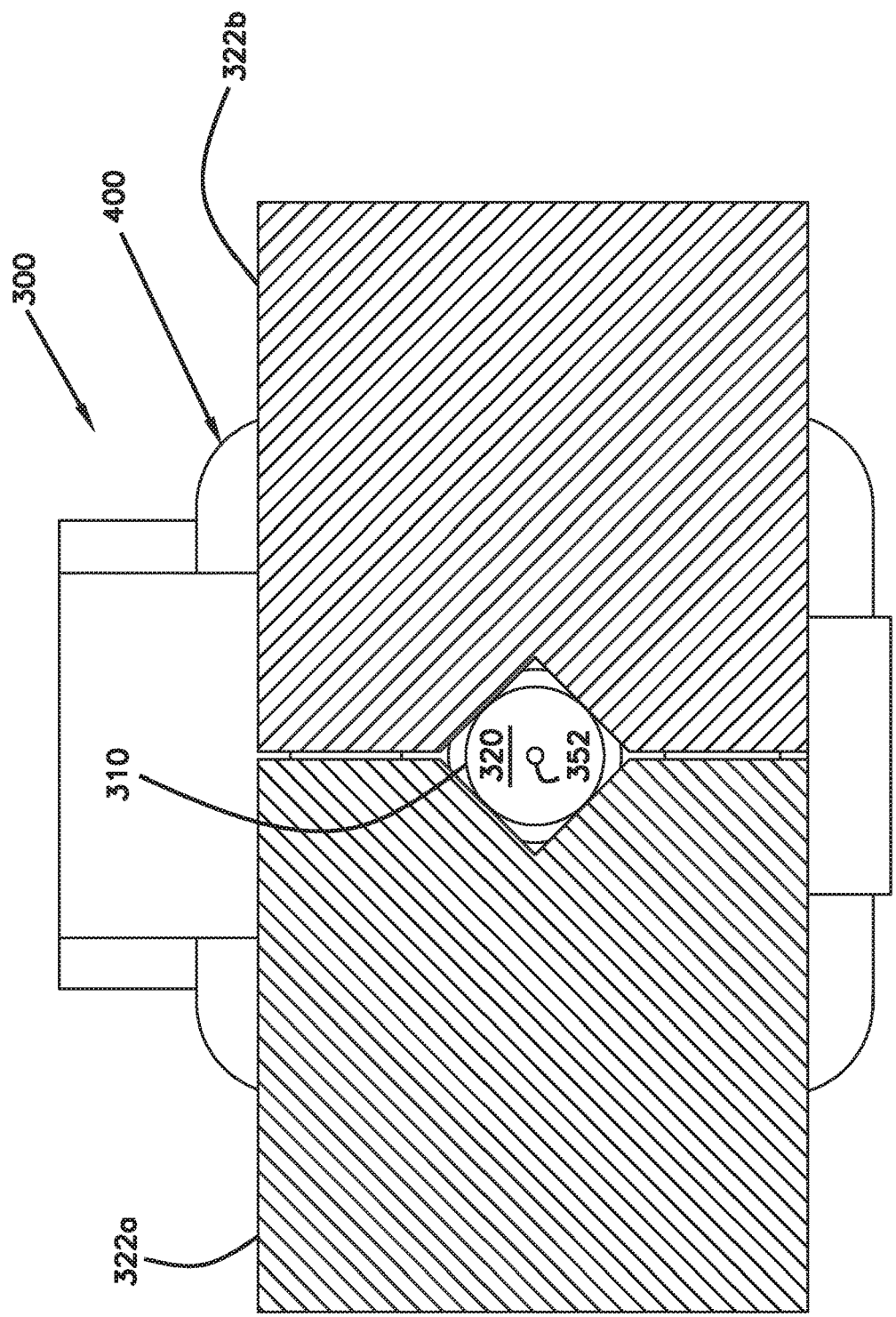
FIG. 19 illustrates a cross-sectional view taken along section line 19-19 of FIG. 18.

Turning to FIG. 10, the V-block guide 322 is configured to support the nozzle 326 of the dispensing device 318 at a first end 332 for concentrically aligning the nozzle 326 with an end face 320 of the fiber optic ferrule 310. The V-block guide 322 may be a dual guide such that the fiber optic ferrule 310 may be supported at an opposite, second end 340 thereof. As depicted in FIGS. 18 and 19, the V-block guide 322 may be formed by two alignment blocks (i.e., the two alignment blocks are the same part, but could be configured as two different parts). For example, the V-block guide 322 can include a first alignment block 322a and a second, opposing alignment block 322b that together capture and align the fiber optic ferrule 310 and the nozzle 326, although alternatives are possible. It will be appreciated that the features of the first alignment block 322a can be the same as the second alignment block 322b. As such, only the first alignment block 322a would be described below.

In certain examples, the first alignment block 322a of the V-block guide 322 may define a groove 343 (e.g., recess, opening, slot) at the first end 332 for receiving the nozzle 326 to concentrically align the nozzle 326 to the end face 320 of the fiber optic ferrule 310. The second end 340 defines a recess 344 for receiving a portion of the fiber optic ferrule 310 that is to be aligned with the nozzle 326. The nozzle 326 has a nozzle opening 346 aligned along a central axis 328 of an optical fiber 352 (see FIG. 14). The nozzle 326 has a nozzle tip 348 that faces the end face 320 of the fiber optic ferrule 310. As such, a centerline of the nozzle 326 can be aligned with a centerline of the fiber optic ferrule 310 that is coaxial with the central axis 328.

Figure 11:
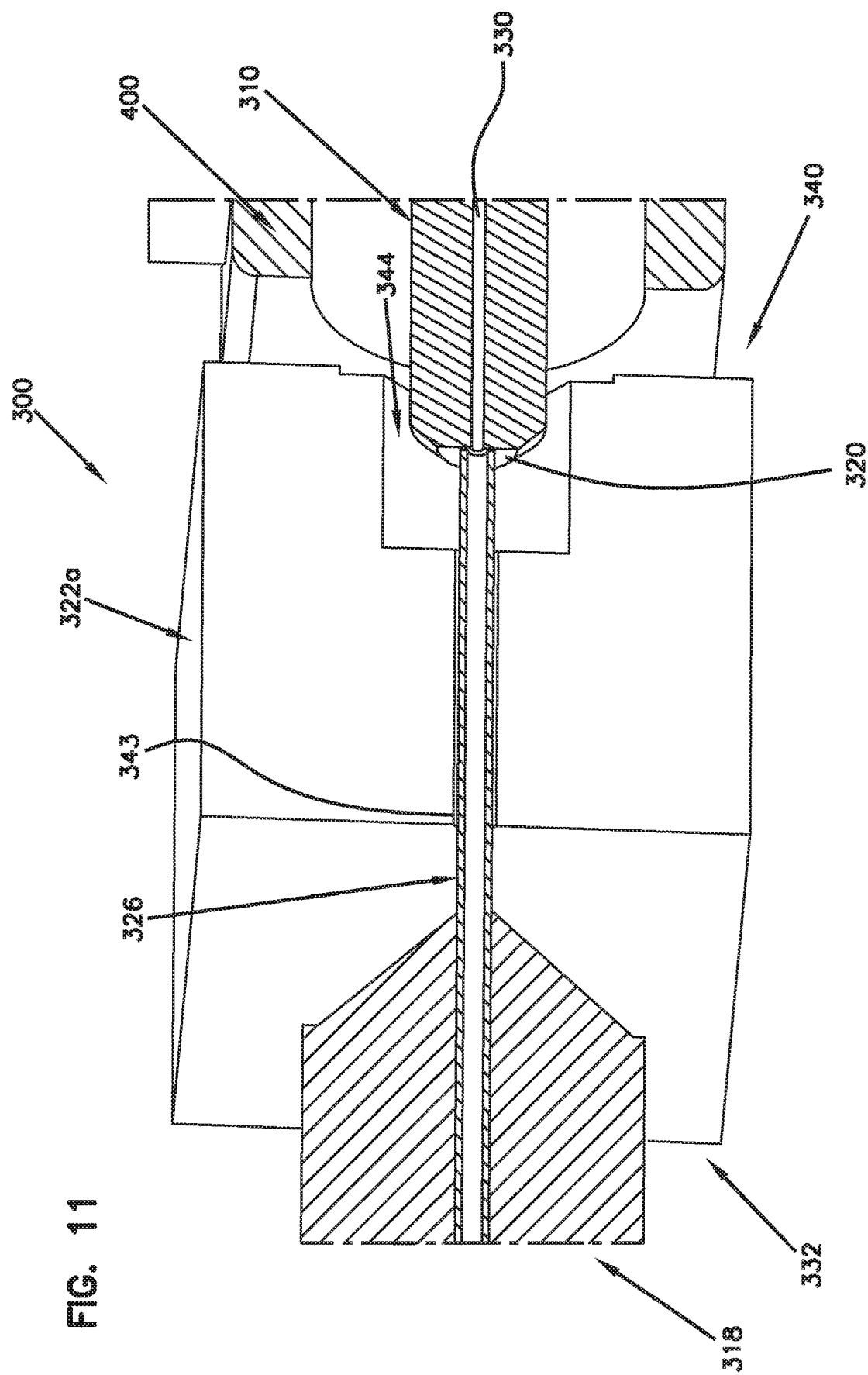

Turning to FIG. 11, the nozzle 326 can be moved relative to the fiber optic ferrule 310 to engage the end face 320. That is, when the adhesive is dispensed from the nozzle 326, the nozzle tip 348 can be moved horizontally to engage (e.g., make contact with) the end face 320 of the fiber optic ferrule 310 for dispensing of the adhesive. Once the nozzle tip 348 engages the end face 320 of the fiber optic ferrule, the nozzle 326 can continue to be moved forward towards the end face 320 until a ferrule spring has some compression, for example, when a LC type connector is used. In certain examples, a spring is not needed in which a force applied type nozzle may be used.

The nozzle 326 is configured to discharge the adhesive from the nozzle opening 346 at the nozzle tip 348. The fiber optic ferrule 310 can be held either horizontally or vertically in the holder to allow the adhesive to be dispensed therein.

Figure 12:
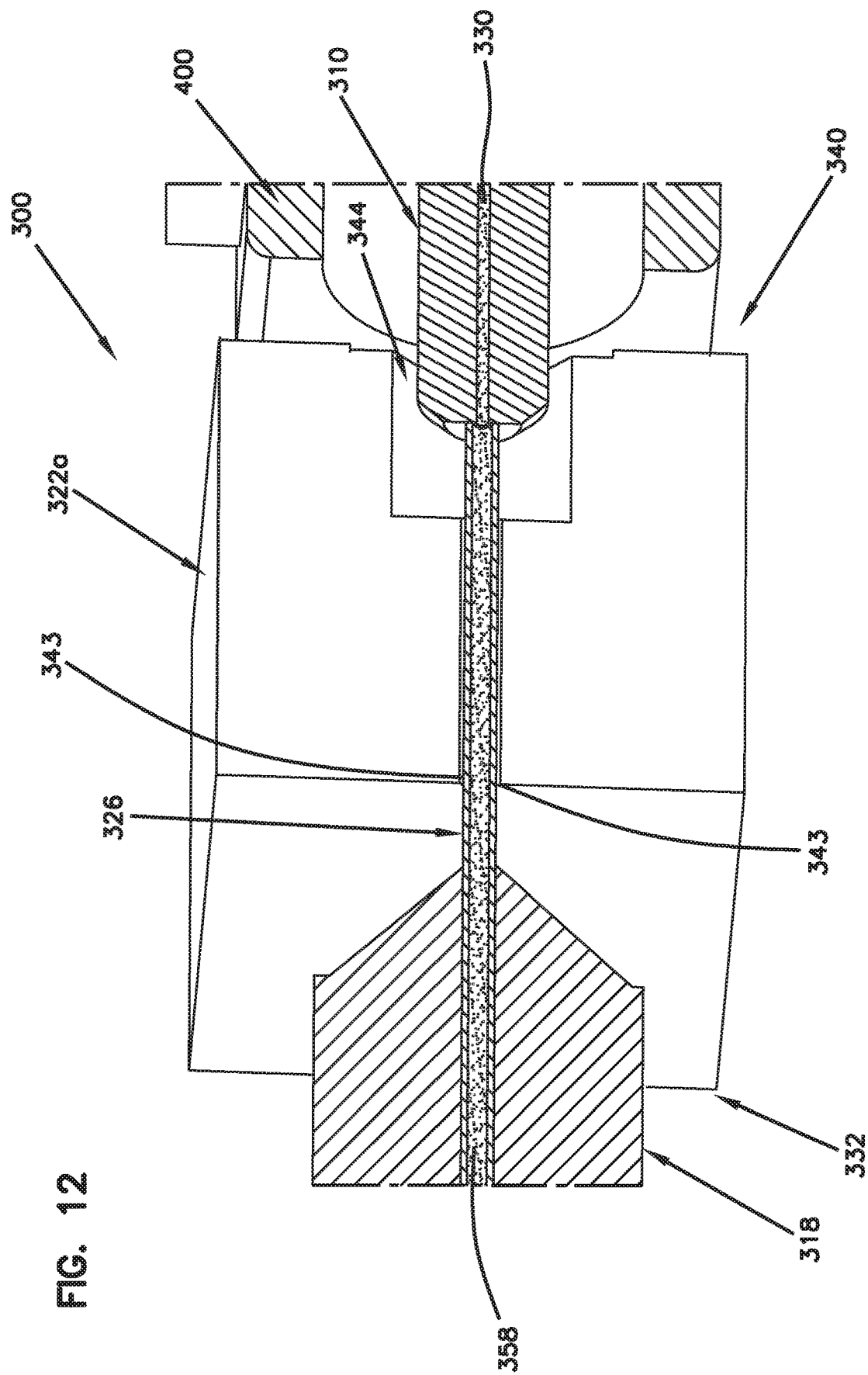

Turning to FIG. 12, an adhesive material 358 (e.g., epoxy) is shown dispensed horizontally into the nozzle 326 and the central passage 330 of the fiber optic ferrule 310. In certain examples, the adhesive material 358 may be a flash cure adhesive. In certain examples, the adhesive material 358 may be a one-part adhesive that ban be catalyzed on a basic surface. The adhesive 358 can be injected through the end face 320 of the fiber optic ferrule 310 when the fiber optic connector 400 is in an essentially vertical position taking advantage of the force of gravity. Optionally, the fiber optic connector 400 is rotated during the fill so that centrifugal forces assist in the fill operation in order to displace air inside the fiber optic connector 400. According to some examples, the fiber optic connector 400 is rotated during the injection of adhesive into the fiber optic ferrule 310. In other examples, rotation may not be required for distribution of adhesive around an optical fiber.

As described above, a precisely-metered adhesive dispenser can be used in the fill operation to inject a desired amount of epoxy within the fiber optic ferrule 310. The desired amount of adhesive depends on the amount of anticipated adhesive displacement when the optical fiber 352 is inserted into the fiber optic ferrule 310.

Dispensing a uniform quantity of adhesive through the end face 320 of the fiber optic ferrule 310 rather than a rear end of the fiber top ferrule 310 can also help to eliminate air bubbles within a ferrule assembly that can lead to stress points due to thermal expansion differentials in a ferrule assembly. To this end, adhesive is applied to the cavity by way of a syringe or other type of metering device. In this case, it is preferable to carry out filling of the adhesive 358 to such a degree that the adhesive 358 is allowed to collect near a rear end (e.g., back side, back end) of the fiber optic ferrule 310. The adhesive 358 needs to be delivered in a measured way so as to allow enough time for the adhesive to flow and adequately fill the central passage 330 of the fiber optic ferrule 310.

Figure 13:
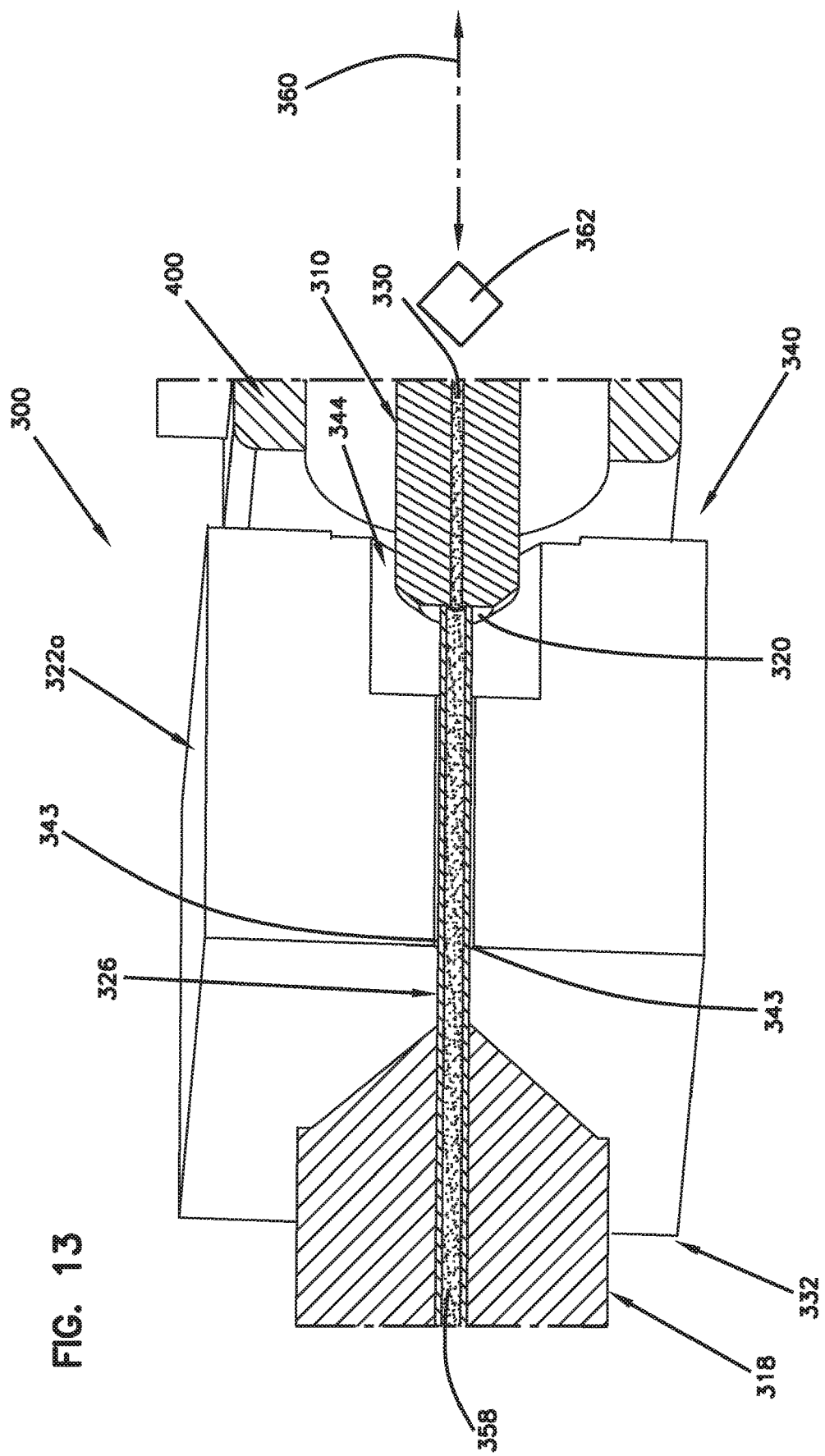

Referring to FIG. 13, an additional advantage of the present disclosure is the ability to observe the central passage 330 of the fiber optic ferrule 310 to determine when the central passage 330 is filled. For example, a sensor (e.g., displacement sensor), represented by arrows identified with reference numeral 360, may be used to detect a volume of adhesive collected within the fiber optic ferrule 310. That is, the sensor detects from or through a rear end of the fiber optic ferrule 310 an amount of adhesive 362 being applied and swelling up inside of the fiber optic ferrule 310. The sensor may be used to sense displacement of the adhesive 358 within the central passage 330 in a direction along a length of the fiber optic ferrule 310 (e.g. along axis X). Dispensing of the adhesive 358 stops when the sensor detects that the fiber optic ferrule 310 is full. That is, once the sensor observes the adhesive beginning to swell, it is determined that the central passage is filled and the application of the adhesive can be discontinued.

The adhesive used is preferably a high strength semi-hermetic polymeric material. Suitable adhesives are well known in the art and preferably include epoxies. Particularly preferred epoxies include Tracon F113 and EpoTEK 353ND.

Figure 14:
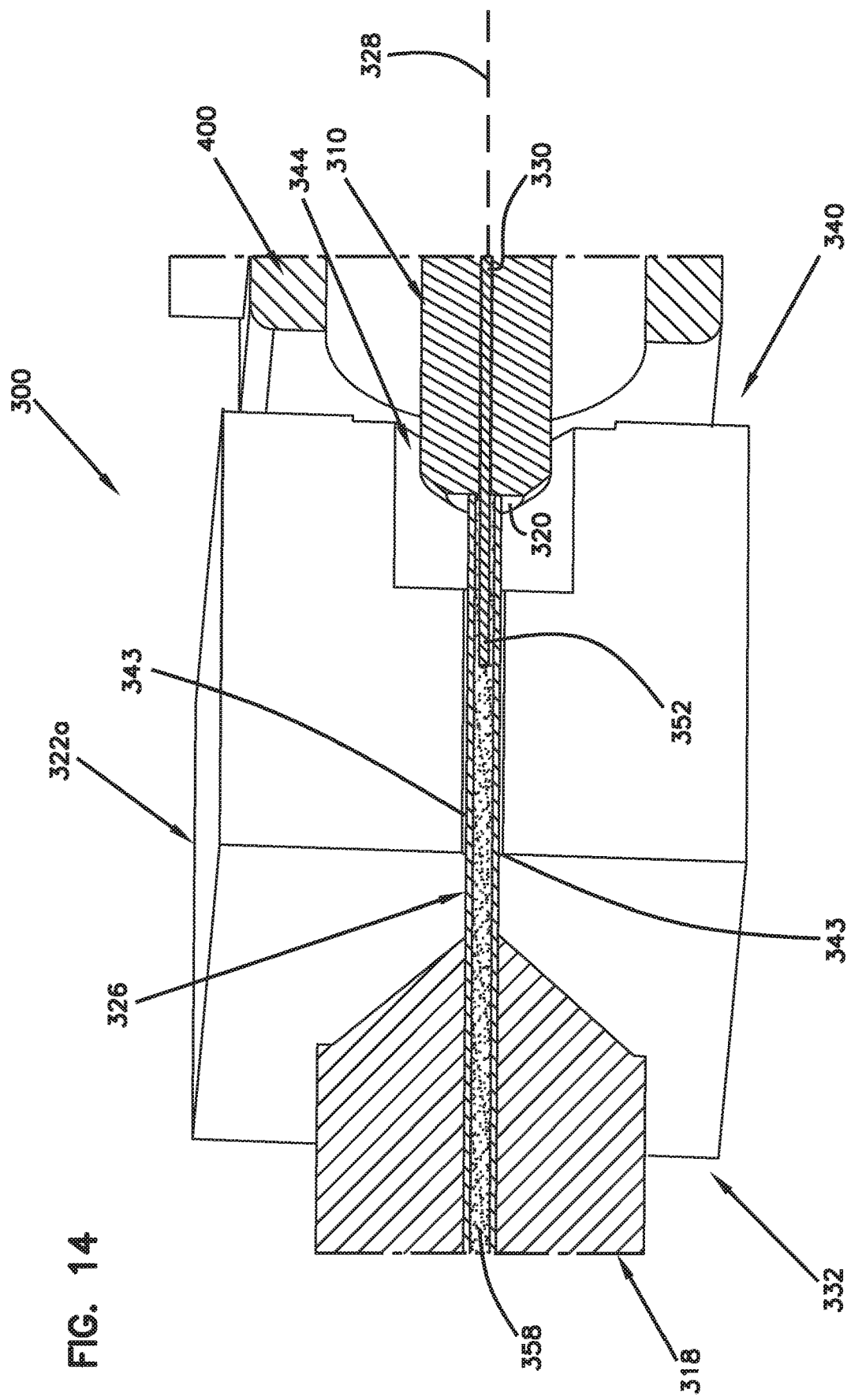

FIG. 14 shows the optical fiber 352 after insertion through the adhesive-filled ferrule with the end 53 of the optical fiber 352 extending distally past/beyond the end face 320 of the fiber optic ferrule 310. The optical fiber 352 may be inserted manually into the fiber optic ferrule 310, although alternatives are possible. In certain examples, the optical fiber 352 may be automatically inserted into the ferrule by using a vision device. The optical fiber 352 may extend past the end face 320 of the fiber optic ferrule 310 by as little as 0.5 mm or a greater distance such as 15.00 mm, although alternatives are possible. In some instances, it may be desirable for the optical fiber 352 to extend at least approximately 10 mm past the end face 320 of the fiber optic ferrule 310, although alternatives are possible. In certain examples, the optical fiber 352 can extend past the end face 320 no more than 25 mm, although alternatives are possible.

FIG. 14 illustrates the position of the nozzle 326 relative to the optical fiber 352 and fiber optic ferrule 310. A fiber insertion device may be used to insert the optical fiber 352 into the adhesive filled central passage 330 of the fiber optic ferrule 310 and into the nozzle opening 346 of the nozzle 326. That is, the optical fiber 352 can be pushed from a rear end of the fiber optic ferrule 310 into the central passage 330 while the nozzle 326 remains in contact with the fiber optic ferrule 310. The optical fiber 352 pushes through the adhesive 358 until the optical fiber 352 protrudes from the fiber optic ferrule 310. It will be appreciated that as the optical fiber 352 is moved distally through the central passage 330 of the fiber optic ferrule 310, at least some of the adhesive can be distally displaced. This displaced adhesive can be deposited back into the nozzle 326. That is, any excess adhesive may be pushed back into the nozzle 326 that is in contact with the end face 320 of the fiber optic ferrule 310.

The optical fiber cable 40 can be adhered to the optical fiber connector 20 by the adhesive 358. Although the adhesive 358 extends around the optical fiber 352 by the insertion of the optical fiber cable 50, since the amount of the injected adhesive 358 is controlled to a suitable amount for the above described reason, it is possible to easily prevent the adhesive 358 from overflowing toward the outside. In this way, by using the nozzle 326, the adhesive 358 can easily be injected in a suitable amount into the fiber optic ferrule 310 and any displacement pushed back into the nozzle 326. Thus, in the case where an optical fiber cable is inserted into the ferrule, there arises no problem such that the adhesive overflows, and furthermore an amount of injected adhesive does not become insufficient, thereby anyone can easily assemble a high quality optical fiber connector.

Furthermore, the dispensing can be done automatically with dispensing equipment well known in the art. In certain examples, the dispensing operation and the fiber insertion steps can be combined to result in an overall reduction in process steps/labor.

Utilization of vibratory or wave energy during the adhesive injection process can also help to speed the delivery of the adhesive into the ferrule and also reduce air bubbles or voids. A holder can be designed to tightly hold the fiber optic connector 400 during the fiber insertion procedure. The holder may have a relieved portion or channel of sufficient width and depth to receive the fiber optic ferrule 310.

A guide positioning mechanism (not shown) may be capable of moving the V-block guide 322 along an axis X, an axis Y, and an axis Z relative to the holder of the fiber optic ferrule. It will be appreciated that the axes X, Y and Z are perpendicularly oriented relative to one another. The axis X can be coaxially aligned with the central axis 328 of the optical fiber 352. In certain examples, the guide positioning mechanism can also be configured to pivot or rotate the V-block guide 322 about the axis X and/or the axis Y and/or the axis Z.

Figure 15:
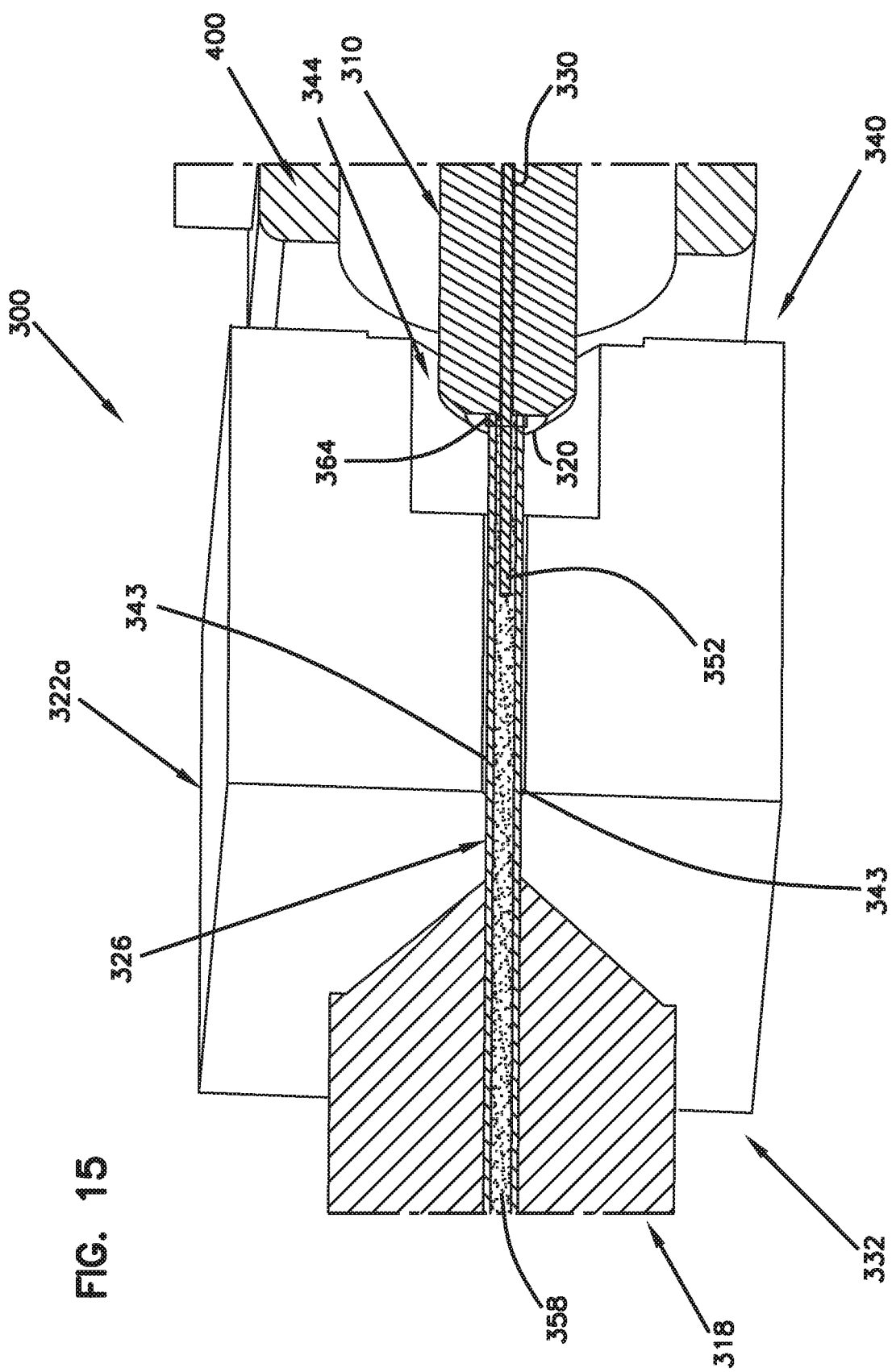

Turning to FIG. 15, the nozzle 326 is shown withdrawn from the end face 320 of the fiber optic ferrule 310 to create a physical distance. In certain examples, the nozzle 326 may be withdrawn or retracted slightly from the end face 320 to create an air gap without withdrawing adhesive from the central passage 330 of the fiber optic ferrule 310. That is, the nozzle 326 may be withdrawn from the end face 320 by as little as 0.5 mm, although alternatives are possible. Depending on the viscosity of the adhesive, an adhesive meniscus 364 (e.g., bead) may be created such that the adhesive meniscus 364 is drawn in the 0.5 mm gap. In certain examples, depending on surface tension and capillary action, the adhesive meniscus 364 may bridge the gap between the nozzle 326 and the end face 320.

Figure 16:
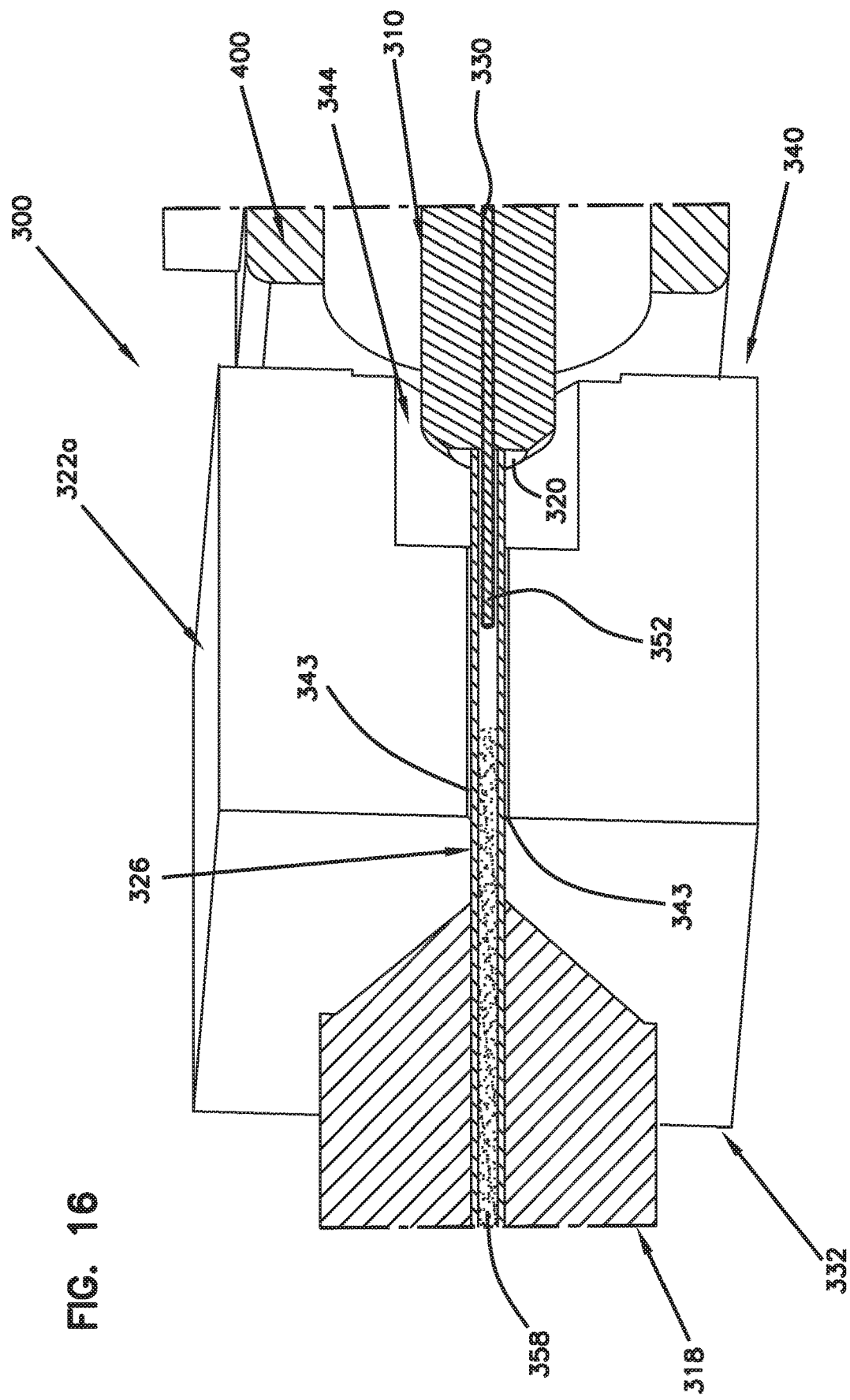
Figure 17:
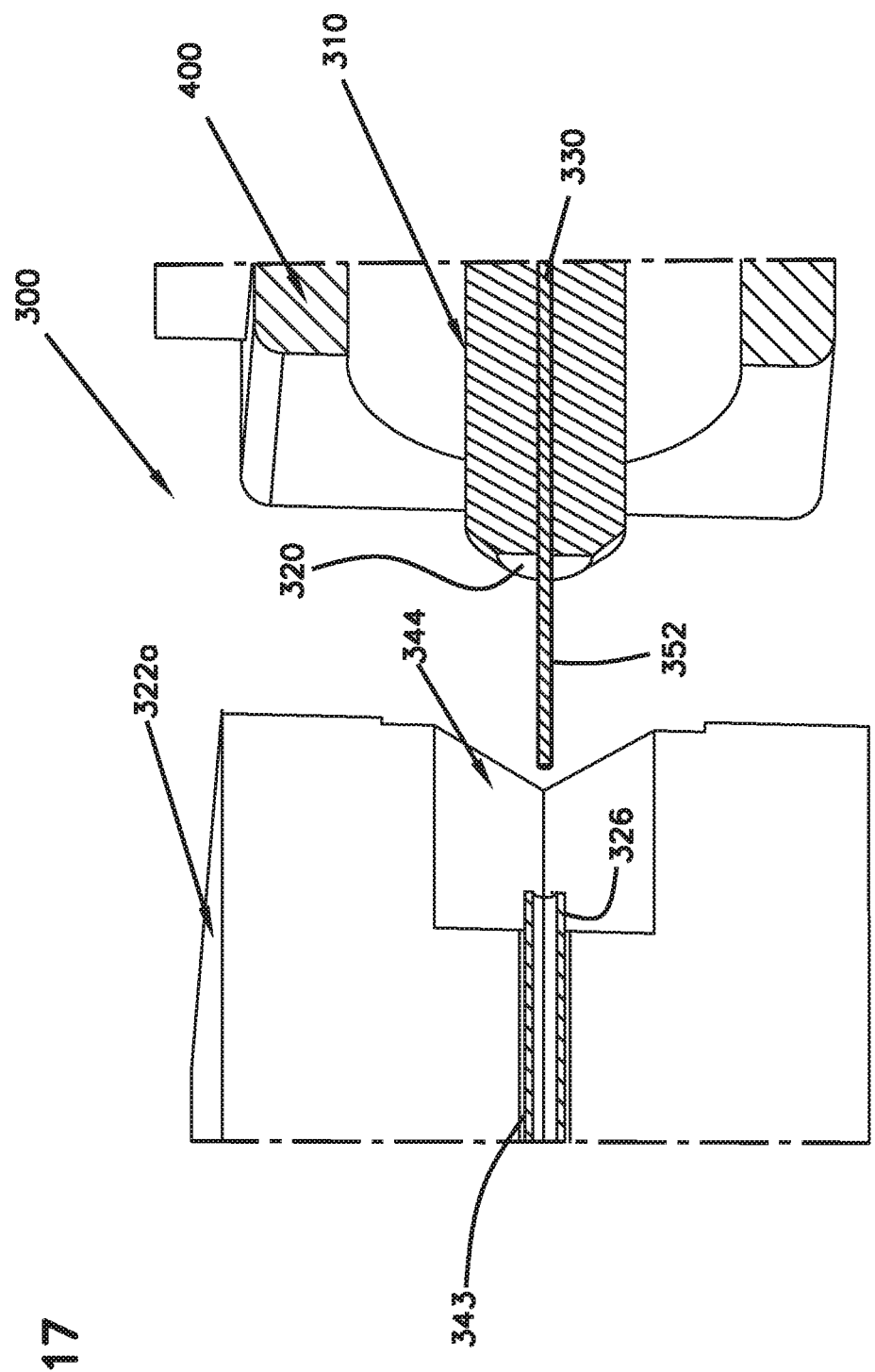

Turning to FIG. 16, the adhesive 358 is shown being withdrawn from the fiber optic connector 400. For example, dispensing of the adhesive 358 can be stopped by a dispensing system. That is, a dispensing system can pull back the adhesive 358 to remove excess adhesive from the end face 320 which can allow any excess adhesive to be pulled inside of the nozzle 326 and away from the end face 320 and the optical fiber 352. In FIG. 17, the nozzle 326 and first alignment block 322a of the V-block guide 322 are shown withdrawn or retracted from the end face 320 of the fiber optic ferrule 310. A void can be formed at the nozzle tip 348 due to the withdrawal of the optical fiber 352. Although there may not be adhesive at the nozzle tip 348, a thin layer of adhesive may remain on the optical fiber 352 upon withdrawal of the optical fiber 352 from the nozzle 326.

Figure 20:
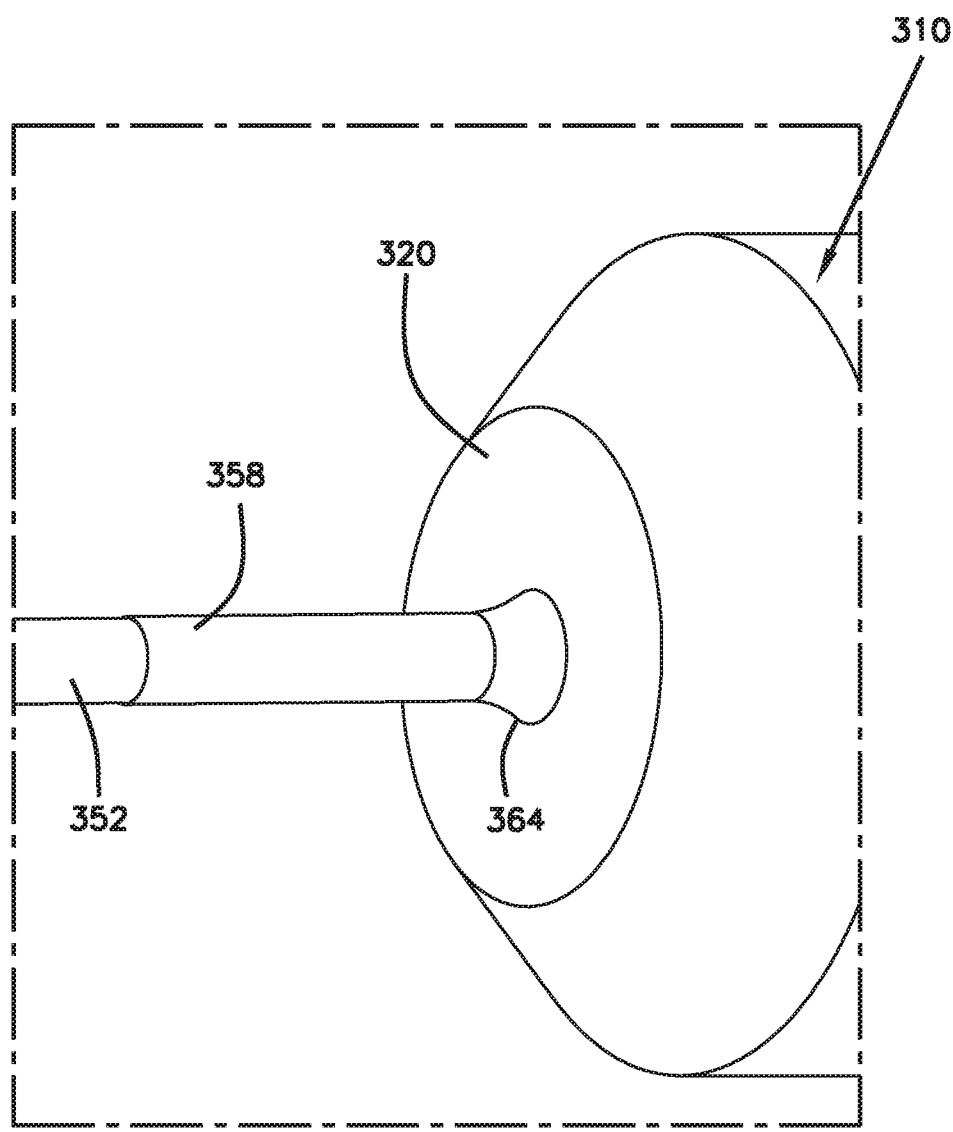
FIG. 20 illustrates an enlarged view of an end face of the fiber optic ferrule of FIG. 9 after securing the optical fiber.

FIG. 20 depicts an enlarged view of the end face 320 of the fiber optic ferrule 310 with the adhesive meniscus 364 formed thereon. The process of dispensing adhesive according to the present disclosure results in a consistently, repeatable, thin film adhesive over the optical fiber 352 and a controlled amount of adhesive that results in a small meniscus 364 at the end face 320 of the fiber optic ferrule 310 and the optical fiber 352.

The optical fiber can be positioned within a fiber opening such that an interface end the optical fiber is located at a pre-determined axial position relative to a distal end of a ferrule. Alternatively, the interface end of the fiber need not be precisely positioned relative to the ferrule and can be positioned generally to protrude from the ferrule end face. Once the adhesive is cured, the optical fiber end can be cleaved to a desired protrusion length. The distal end face of the ferrule and the distal end of the optical fiber can be polished using one or more abrasive mechanical polishing steps. The mechanical polishing steps can provide shaping of the fiber and/or the ferrule, can provide imperfection removal of the fiber distal end face and can assist in establishing a desired relative axial position between the fiber tip and the ferrule end face (e.g., a desired fiber tip protrusion length, a desired fiber tip recession depth, or a flush configuration). In certain examples, a non-contact energy source (e.g., plasma discharge, laser or other energy source previously described) can be used to further process (e.g., finally process) the optical fiber tip and/or the ferrule end face. For example, the non-contact energy source can be used to shape the fiber tip, re-flow the surface of the fiber tip or clean the surface of the fiber tip. Shaping the fiber tip can include modifying the fiber tip to include at least some curvature (e.g., shaping to a desired fiber radius). In certain examples, the fiber tip and the ferrule end are modified in shape so as to comply with industry standards or parameters for end face geometry. The method reduces the time to perform cleaving and polishing steps due to the reduced amount of excess adhesive that can contaminate product equipment or other processes.

Another aspect of the present disclosure relates to a method of terminating an optical fiber with a fiber optic ferrule. The method involves applying a fluid adhesive in the passageway of the fiber optic ferrule from a front end face of the fiber optic ferrule.

The method can include the following steps: (a) injecting an amount of adhesive material into a passage of a ferrule body from a front end face of a fiber optic ferrule; and (b) inserting an end of the optical fiber into the passage of the ferrule body from a second end thereof, with a bare portion of an optical fiber and at least a portion of a coated portion of the optical fiber inserted into the passage of the ferrule body. The method can also include a step of placing a nozzle in close proximity to the front end face of the fiber optic ferrule such that a tip of the nozzle contacts the front end face of the fiber optic ferrule. When placing the nozzle in close proximity to the front end face of the fiber optic ferrule, a centerline of the nozzle is aligned with a centerline of the front end face of the fiber optic ferrule. In certain examples, aligning the centerline of the nozzle with the centerline of the front end face of the fiber optic ferrule includes mounting a V-block guide to the nozzle to concentrically align the nozzle to the end face of the fiber optic ferrule. The nozzle can impose a force on the fiber optic ferrule to cause compression prior to injecting the amount of adhesive material into the passage. The method can include a step of detecting presence of the adhesive material within the passage of the ferrule body to determine whether the passage is appropriately filled with the adhesive material. wherein detecting the presence of the adhesive material comprises determining through the second end of the ferrule body a volume of adhesive at a predetermined position within the ferrule body. In certain examples, detecting the volume of adhesive is by a displacement sensor. The method can include a step of removing the nozzle from close proximity to the front end face of the fiber optic ferrule to create a meniscus of adhesive.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A method of terminating an optical fiber with a fiber optic ferrule, the method comprising:
   providing a cable with the optical fiber, the optical fiber including a coating portion around the optical fiber, the optical fiber also including a bare portion adjacent an end of the optical fiber;
   providing the fiber optic ferrule, the fiber optic ferrule including a ferrule body extending from a first end to an opposite second end, the ferrule body including a passage extending between the first and the second ends of the ferrule body, the fiber optic ferrule having a front end face at the first end;
   injecting an amount of adhesive material into the passage of the ferrule body from the front end face of the fiber optic ferrule, wherein injecting the amount of adhesive material includes placing a nozzle in close proximity to the front end face of the fiber optic ferrule such that a tip of the nozzle contacts the front end face of the fiber optic ferrule, the nozzle imposing a force on the fiber optic ferrule to cause compression prior to injecting the amount of adhesive material into the passage; and
   inserting the end of the optical fiber into the passage of the ferrule body from the second end thereof, with the bare portion of the optical fiber and at least a portion of the coated portion of the optical fiber inserted into the passage of the ferrule body, wherein the adhesive material is adapted to hold the optical fiber to the ferrule body.

2. The method of claim 1, further comprising detecting presence of the adhesive material within the passage of the ferrule body to determine whether the passage is appropriately filled with the adhesive material.

3. The method of claim 2, wherein detecting the presence of the adhesive material comprises determining through the second end of the ferrule body a volume of adhesive at a predetermined position within the ferrule body.

4. The method of claim 3, wherein determining the volume of adhesive is by a displacement sensor.

5. The method of claim 1, further comprising a step of removing the nozzle from close proximity to the front end face of the fiber optic ferrule to create a meniscus of adhesive.

6. The method of claim 1, further comprising a step of curing the adhesive by applying vibratory or wave energy to the fiber optic ferrule.

7. The method of claim 1, wherein placing the nozzle in close proximity to the front end face of the fiber optic ferrule includes aligning a centerline of the nozzle with a centerline of the front end face of the fiber optic ferrule.

8. The method of claim 7, wherein aligning the centerline of the nozzle with the centerline of the front end face of the fiber optic ferrule includes mounting a V-block guide to the nozzle to concentrically align the nozzle to the end face of the fiber optic ferrule.

9. A method of injecting adhesive into an optical connector, the optical connector including a ferrule with a passage extending between first and second ends of the ferrule, the ferrule having a front end face at the first end, the method comprising the steps of:
- providing a conduit with adhesive loaded therein;
- aligning the conduit to be substantially aligned with the front end face of the ferrule;
- moving the conduit toward the front end face of the ferrule to make contact therewith, wherein the conduit is moved forward until a compression force is applied upon the ferrule;
- dispensing from the conduit a portion of the adhesive into the passage of the ferrule from the front end face of the ferrule;
- detecting from the second end of the ferrule a volume of adhesive within the ferrule to determine appropriate adhesive fullness prior to insertion of an optical fiber into the passage of the ferrule and the conduit;
- withdrawing the conduit a distance from the front end face of the ferrule that results in a meniscus forming between the conduit and the front end face of the ferrule, and wherein excess adhesive is pulled inside of the conduit and away from the front end face of the ferrule and the optical fiber; and
- removing the conduit from the ferrule.

10. The method of claim 9, wherein the conduit is a syringe.

11. The method of claim 9, wherein the distance of withdrawing the conduit is at least 0.5 mm.

12. The method of claim 9, wherein the step of dispensing the adhesive is effected by a motorized plunger.

13. The method of claim 12, wherein the motorized plunger is controlled by a control module.

14. The method of claim 12, further comprising a step of applying vibratory or wave energy to the adhesive.

15. The method of claim 14, wherein the vibratory or wave energy is applied while the optical fiber is being inserted into the passage of the ferrule.

16. A method of terminating an optical fiber with a fiber optic ferrule, the method comprising:
- providing a cable with the optical fiber, the optical fiber including a coating portion around the optical fiber, the optical fiber also including a bare portion adjacent an end of the optical fiber;
- providing the fiber optic ferrule, the fiber optic ferrule including a ferrule body extending from a first end to an opposite second end, the ferrule body including a passage extending between the first and the second ends of the ferrule body, the fiber optic ferrule having a front end face at the first end;
- injecting an amount of adhesive material into the passage of the ferrule body from the front end face of the fiber optic ferrule;
- inserting the end of the optical fiber into the passage of the ferrule body from the second end thereof, with the bare portion of the optical fiber and at least a portion of the coated portion of the optical fiber inserted into the passage of the ferrule body, wherein the adhesive material is adapted to hold the optical fiber to the ferrule body; and
- detecting presence of the adhesive material within the passage of the ferrule body to determine whether the passage is appropriately filled with the adhesive material, wherein detecting the presence of the adhesive material comprises determining through the second end of the ferrule body a volume of adhesive at a predetermined position within the ferrule body, wherein determining the volume of adhesive is by a displacement sensor.

17. A method of terminating an optical fiber with a fiber optic ferrule, the method comprising:
- providing a cable with the optical fiber, the optical fiber including a coating portion around the optical fiber, the optical fiber also including a bare portion adjacent an end of the optical fiber;
- providing the fiber optic ferrule, the fiber optic ferrule including a ferrule body extending from a first end to an opposite second end, the ferrule body including a passage extending between the first and the second ends of the ferrule body, the fiber optic ferrule having a front end face at the first end;
- injecting an amount of adhesive material into the passage of the ferrule body from the front end face of the fiber optic ferrule;
- inserting the end of the optical fiber into the passage of the ferrule body from the second end thereof, with the bare portion of the optical fiber and at least a portion of the coated portion of the optical fiber inserted into the passage of the ferrule body, wherein the adhesive material is adapted to hold the optical fiber to the ferrule body; and
- removing the nozzle from close proximity to the front end face of the fiber optic ferrule to create a meniscus of adhesive.

* * * * *